United States Patent Office 2,806,126
Patented Sept. 10, 1957

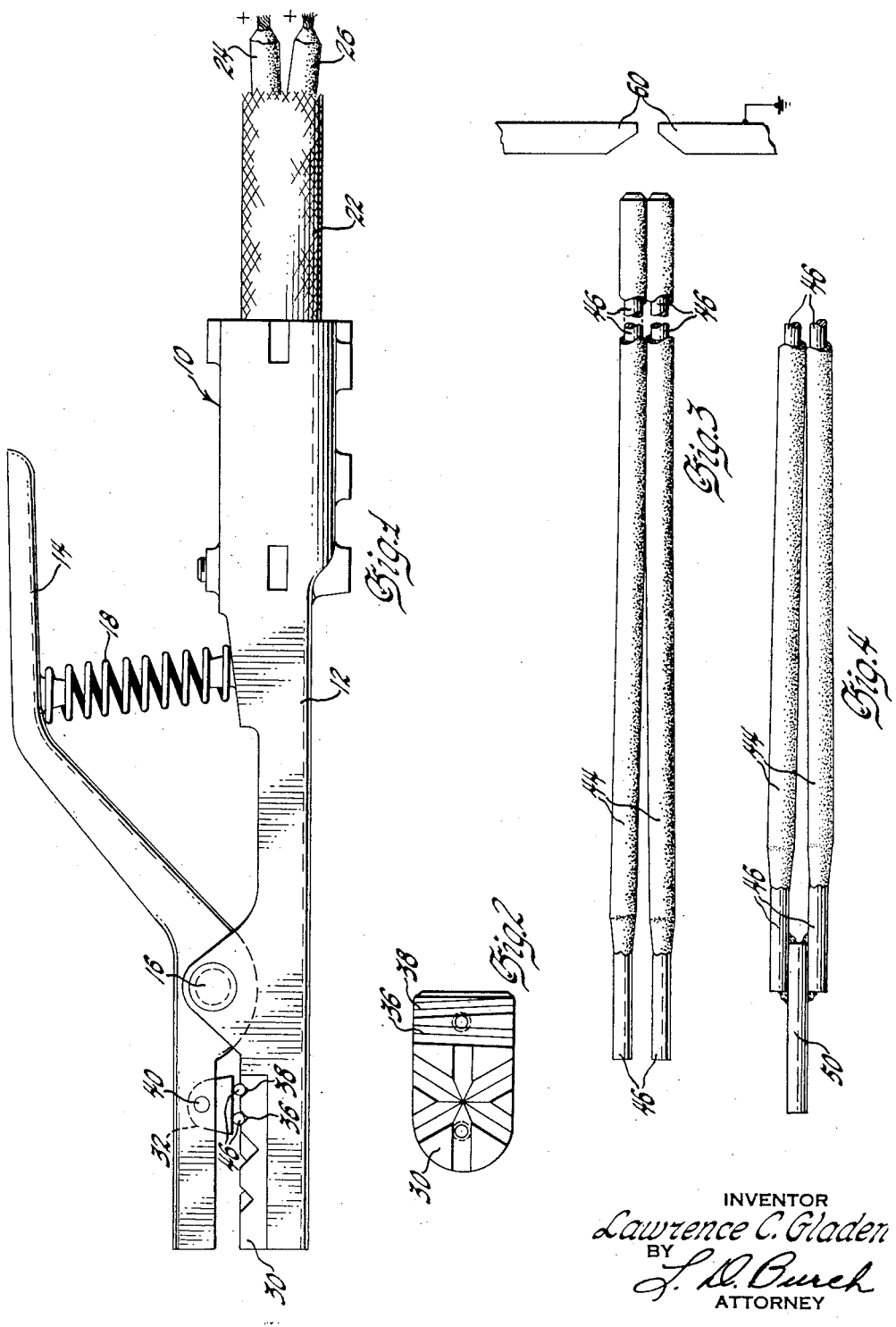

2,806,126

ARC WELDING APPARATUS

Lawrence C. Gladen, Willoughby, Ohio, assignor to General Motors Corporation, Detroit, Mich., a corporation of Delaware Application November 26, 1954, Serial No. 471,437

4 Claims. (Cl. 219—131)

This invention relates to a method of and apparatus for metallic arc welding using multiple electrodes in which the welding current is applied to one electrode at a time and is aperiodically transferred from one electrode to another as the ends of the electrodes are alternately consumed.

The invention is specially suited for use in open arc welding of grooved joints as are employed in heavy weldments such as armor metal, which, in order to pass rigid ordnance specifications, must be formed with strong and metallurgically sound welds of high impact properties.

In the welding of beveled or V-shaped groove joints as are employed for thick weldments including armor metal and heavy plates, it has been found that the diameter size of the welding electrode is determined largely by the width of the groove opening in order to avoid slag inclusions and inferior welds that are produced when large electrodes are employed in narrow openings. These considerations dictate the use of small diameter electrodes, which require reduced welding currents and result in increasing the time required to lay a weld. While currents in excess of those specified for the particular diameter size of electrode being used may be employed, this results, among other things, in overheating of the electrode with resultant excess stub length.

The present invention has among its objects to provide an improved method of and apparatus for metallic arc welding using multiple electrodes which provide a substantial increase in welding speed and deposition of weld material over single electrode methods while using electrodes of small diameter size and which permit of the use of currents in excess of those specified for a given electrode size without overheating of the electrodes and resulting excessive electrode stub lengths. Other objects are to provide an improved electrode holder for a dual electrode assembly in accordance with the present invention that compensates for variations in the diameters of the electrode core wires or in the depth of the grooves in the clamping jaws of the electrode holder so that equal pressure may be applied to assure firm gripping of the electrodes in the holder.

In accordance with the invention there is provided an electrode assembly comprising a pair of insulated weld rods which are so constructed or clamped in the jaws of an electrode holder as to be held closely adjacent to and preferably in tension against each other. The method of the invention comprehends striking an arc from one of the electrodes to the workpiece and maintaining the arc welding voltage alternately between the two electrodes and ground to effect alternate consumption of the electrodes. The welding current is caused to flow through only one electrode at a time until so much of its end is consumed or burned off that the welding current will be automatically transferred to and flow through the other electrode by reason of the shorter electrode-to-workpiece gap spacing thereof and then burn off so much of the latter electrode as will cause the welding current to be transferred back to the first electrode or to still another electrode. The welding current thus switches back and forth between the two electrodes, creating a rolling arc which aids in the deposition of the weld material and in the production of a superior weld.

The above and other objects, features and advantages of the present invention will appear more fully from the following description and drawings wherein:

Fig. 1 illustrates an electrode holder for a form of multiple electrode assembly in accordance with the present invention;

Fig. 2 illustrates a form of clamping jaw that may be employed in the electrode holder of Fig. 1;

Fig. 3 illustrates a form of multiple electrode assembly in accordance with the present invention; and Fig. 4 illustrates a construction for the ends of the electrodes of Fig. 3 by means of which the electrodes may be supported in a conventional electrode holder.

Referring to the drawings, Fig. 1 illustrates an electrode holder 10 that may be used to hold a multiple electrode assembly in accordance with the present invention and comprises a base 12 and an off-set handle 14 pivotally mounted on the base as at 16 with a spring tension member 18 spaced from the pivot and extending between the base and handle, substantially as shown. One end of the base 12 is clamped to a current supply cable 22 which may contain a plurality of braided conductors 24, 26 that are adapted to be connected to the same terminal of an A. C. or D. C. electric welding generator or source (not shown), the other terminal of which is connected to ground. The other end of the base 12 includes one element 30 of a pair of cooperating jaws or electrode clamping surfaces 30 and 32 respectively carried on the base and the handle of the electrode holder.

As shown in Fig. 2, the work contacting surface of the lower jaw 30 includes a pair of generally transversely extending grooves 36, 38, which, in accordance with the present invention, are inclined slightly towards each other and are shown converging at a small angle of, say, 2 or more degrees, so that the electrodes will touch and be held in tension against each other, as explained below. The upper jaw member 32 carried by the handle is pivotally mounted thereon as by a dowel pin 40 so as to provide a floating or hinged contact jaw. Such a construction compensates for any variations in the diameters of the central core wire of the welding electrodes or for variations in the depth of the grooves in the lower jaw and distributes equal clamping pressure on the electrodes, thereby assuring firm gripping thereof in the jaws of the electrode holder.

The electrodes shown in Fig. 3 are of the austenitic variety having an insulating flux coating 44 over a central core 46 or weld rod. The insulating covering near the holder end of the electrodes is "skinned" back a short distance so that their central cores or weld rods may be in electrical contact with and carry current from the holder. The electrodes are clamped at their skinned ends in the jaws of the holder of Fig. 1 so as to converge towards each other and will be in non-parallel relation at least over a portion of the length thereof. Since the electrodes are of substantial length and are disposed as described above, the electrodes will touch a short distance from their skinned ends and will bow towards each other so as to be held in tension with their insulated coatings touching over a major portion of their length measured from the workpiece end thereof. In this manner the spacing between the weld rods is kept to a minimum and the rods will remain in contacting relation as they are consumed until they are too short to be used.

Fig. 4 illustrates a construction for a dual electrode design which employs a stub 50 that spreads the ends of the electrodes to provide the tensioning effect of the converging grooves 36 and 38 of Fig. 2 and permits of the use of a conventional electrode holder. In this case the welding electrodes are geometrically positioned in a common plane with their flux coatings parallel and flush to each other and are joined together at their skinned ends with the stub 50 which may be suitably fused, as by resistance welding, to the rods.

The stub 50 can be of any shape, although a round stub may be preferred in order that the dual unit can be positioned freely in any standard electrode holder. The operator can then turn the multiple electrode assembly to the position most comfortable for his technique. The stub may be of mild steel composition and should be of sufficient diameter to fill the space between the skinned ends of the electrodes and to carry the welding current without excessive overheating. Since the stub 50 carries current continuously, it will necessarily be of larger diameter than the individual electrodes which are only intermittently energized.

Since the flux coatings of the electrodes are partially insulating, welding current will be carried by only one electrode at a time and will flow through the electrode that is brought closest to the grounded workpiece 60. An arc will then be established between the end of that electrode and the workpiece so as to burn off material from the end of the electrode. After so much of the end of the first energized electrode has been consumed and deposited in the weld that the electrode-to-workpiece gap spacing of an adjacent electrode is less than or offers less resistance to flow of current than the first energized electrode, the welding current is automatically transferred or switched to the adjacent electrode and establishes an arc between its end and ground to burn off enough of its end as to transfer the current back to the first electrode or to another electrode, if more than two electrodes are employed. The welding current is thus transferred aperiodically between the electrodes which are alternately or successively consumed at a substantially uniform rate.

The electrode holder 10 is held in the gloved hands of the operator and in such a position that one electrode is in advance of and precedes the other in relation to the direction of the length of the grooved joints to be welded. Each electrode appears to establish its own arc as the current is switched from one electrode to another resulting in a rolling arc which not only aids in the deposition of the weld material but creates some agitation and slight turbulence of the molten weld pool. This agitation tends to cook out to a greater degree foreign impurities and gases and results in a superior weld that has been found to be metallurgically sound and possessed of good impact properties.

The invention permits of the use of small diameter size electrodes and since the welding current is carried by only one electrode at a time, currents in excess of those specified for a given electrode diameter size may be employed, sufficient cooling being acquired by the electrode or electrodes not being consumed to allow working the multiple electrode assembly of the present invention at higher current densities without undue overheating. In addition, substantial improvements in welding speed are realized, the present invention yielding increases in welding speed from 65 to 75 percent over present single electrode methods.

While the invention has been shown embodied in a dual electrode design, more than two electrodes could be employed.

What is claimed is:

1. The combination of a pair of separate and distinct welding electrodes each having its own separate insulating flux coating over a central core with one end of each electrode having the coating skinned from the core thereof, a source of electrical power and an electrode holder connected to said source of electrical power and holding said electrodes by their skinned ends and including a clamping jaw having a pair of generally transversely extending grooves therein converging at a slight angle to each other for receiving and spreading the skinned ends of said electrodes therein commonly connecting said electrodes to said source of electrical power and holding the electrodes in tension against each other with the insulated coatings of said electrodes touching over the major portion of their length and separating the central cores thereof.

2. A welding electrode holder comprising the combination of a base member, and a handle member pivotally mounted on said base member, tensioning means between said members and a pair of electrode clamping jaws carried by said members adapted to clamp a pair of elongated welding electrodes, one of said jaws being pivotally mounted on one of said members on an axis parallel to the longitudinal axis of the electrodes.

3. A welding electrode holder adapted to hold a pair of separate, distinct welding electrodes comprising a base member, a handle member pivotally mounted on the base member, tensioning means between said members and a pair of electrode clamping jaws carried by said members, one of said jaws on one of the members having a pair of generally transversely extending grooves therein converging at a slight angle to each other for receiving and spreading the ends of a pair of elongated welding electrodes, the other of said work clamping jaws being pivotally mounted on the other of said members on an axis parallel to the longitudinal axis of said electrodes.

4. A multiple electrode arc welding apparatus for laying a weld in a joint between a pair of weldments comprising the combination of a plurality of juxtaposed, separate and distinct welding electrodes each having a central core rod, a separate insulating flux coating completely surrounding the central core rod and separating the core rod of one electrode from the core rod of the other, one end of each electrode having the coating skinned from the core thereof, a source of electrical power and an electrode holder connected thereto and supporting the electrodes by the skinned ends thereof and holding the electrodes in tension against each other with their insulating coatings touching in line contact relation over the major portion of the length of the electrodes, said electrodes being commonly connected to said source of electrical power and positioned in said holder so that one electrode precedes a following electrode in relation to the direction of the joint between said weldments.

References Cited in the file of this patent
UNITED STATES PATENTS

| | | |
|---|---|---|
| 1,807,961 | Burnish | June 2, 1931 |
| 1,834,069 | Miller | Dec. 1, 1931 |
| 1,841,214 | Saives | Jan. 12, 1932 |
| 1,857,521 | Stresau et al. | May 10, 1932 |
| 2,003,196 | Jackson | May 28, 1935 |
| 2,044,058 | Bustamante | June 16, 1936 |
| 2,347,880 | Budd | May 2, 1944 |
| 2,377,203 | Bannan | May 29, 1945 |
| 2,379,777 | Zeilstra | July 3, 1945 |

FOREIGN PATENTS

| | | |
|---|---|---|
| 5,184 | Australia | Dec. 13, 1926 |